(12) United States Patent
Gallup

(10) Patent No.: US 9,150,059 B2
(45) Date of Patent: Oct. 6, 2015

(54) WINCH POWERED TIRE BEAD BREAKER

(71) Applicant: Mark Gallup, Rosemary (CA)

(72) Inventor: Mark Gallup, Rosemary (CA)

( * ) Notice: Subject to any disclaimer, the term of this patent is extended or adjusted under 35 U.S.C. 154(b) by 386 days.

(21) Appl. No.: 13/846,534

(22) Filed: Mar. 18, 2013

(65) Prior Publication Data

US 2013/0276993 A1 Oct. 24, 2013

Related U.S. Application Data

(63) Continuation-in-part of application No. 13/423,412, filed on Mar. 19, 2012, now abandoned.

(51) Int. Cl.
*B60C 25/13* (2006.01)
*B60C 25/132* (2006.01)

(52) U.S. Cl.
CPC ............... *B60C 25/13* (2013.01); *B60C 25/132* (2013.01)

(58) Field of Classification Search
CPC .. B60C 25/138; B60C 25/13; B60C 25/0515; B60C 25/132; B60C 25/0578; B60C 25/0593; B60C 25/135; B60C 25/0521; B60C 25/025; B60C 25/04
See application file for complete search history.

(56) References Cited

U.S. PATENT DOCUMENTS

| | | | |
|---|---|---|---|
| 2,599,232 A | 6/1952 | Cebolski | |
| 4,759,395 A * | 7/1988 | Tsukamoto | 157/1.2 |
| 6,786,267 B1 * | 9/2004 | Warren | 157/1.2 |
| 6,932,137 B1 * | 8/2005 | Curtis | 157/1.17 |
| 7,011,131 B2 | 3/2006 | Chappell et al. | |
| 7,350,554 B1 * | 4/2008 | Okrepkie et al. | 157/1.17 |
| 7,426,953 B2 | 9/2008 | Baker et al. | |
| 2003/0066613 A1 | 4/2003 | Bishop | |
| 2004/0140059 A1 * | 7/2004 | Wagner | 157/1.28 |

FOREIGN PATENT DOCUMENTS

AU 15187/88 2/1989

* cited by examiner

*Primary Examiner* — Robert Scruggs
(74) *Attorney, Agent, or Firm* — Goodwin Law; Sean W. Goodwin

(57) ABSTRACT

A winch powered tire bead breaker has a static support arm for temporarily mounting the bead breaker to a vehicle mountable winch and bracing there against. The bead breaker further has a moveable arm that is pivotally connected to the static support arm which is moveable relative to the static support arm. A working end of the winch can be releasably secured to the moveable arm and the winch actuated for moving the moveable arm from an open position to its closed position. The sidewalls of a wheel mounted tire, positioned between the moveable and static support arms, are squeezed as the moveable arm is actuated into its closed position for breaking a tire bead.

19 Claims, 10 Drawing Sheets

WINCH POWERED TIRE BEAD BREAKER

CROSS-RELATED APPLICATIONS

This application claims the benefits under 35 U.S.C. 120 of the U.S. patent application Ser. No. 13/423,412, filed on Mar. 19, 2012, which is incorporated fully herein by reference.

FIELD

Embodiments disclosed herein generally relate to a bead breaker for the breaking of a tire bead from a wheel, and more particularly to a winch powered tire bead breaker.

BACKGROUND

Removal of a tire which is seated on a rim of a wheel is a difficult task without the use of specialized equipment. Probably the most difficult step in the process is the first step which is "breaking the bead" or unseating the tire from the rim of the wheel.

Commonly, a wheel-mounted tire that needs replacing is brought into a workshop and is placed on a bead-breaking apparatus. Such bead-breaking apparatus would then apply a pressure on one side of the tire to break the tire bead on that side, and then the tire is rotated or flipped over and the process repeated to break the bead on the other side, thus allowing removal of the tire from the wheel.

However, many ranchers, farmers, and outdoor enthusiasts may come across situations where they are in a remote geographic location and require the changing out a tire on a wheel. In such circumstances, and without a workshop with the proper equipment readily or conveniently nearby, portable tire bead-breaking apparatus have been useful.

U.S. Pat. No. 6,786,267 to Warren discloses a tire bead breaker having an elongate bar with two opposing ends, each opposing end having a pad to engage a sidewall of a tire. A central rod, sufficiently long enough to pass through the elongate bar and through the central portion of a wheel, is threadably adapted to receive a locking plate at one end. In operation, the elongate bar is placed over a tire, the central rod placed through the bar and the wheel, and the locking plate is threadably secured to the central rod. Then an operator can manually turn the central rod to cause the locking plate to travel towards the elongate bar, causing a pressure to be applied to the sidewalls engaging the two opposing pads, and thereby break the bead.

U.S. Pat. No. 6,932,137 to Curtis discloses a tire bead breaker that uses a lever to apply pressure on the sidewalls of a tire to break a tire bead. Curtis' tire bead breaker includes an elongate support having a lever arm at one end. The elongate support is positionable across the diameter of the tire and actuation of the lever arm applies a pressure on the elongate support for breaking the tire bead.

Australian Published Patent Application 1988015187 to Jakens discloses a lever actuated tire bead breaker that is mountable to a trailer hitch on a vehicle.

US Published Patent Serial No. US 2004/0140059 to Wagner teaches a portable tire bead breaker that uses pneumatic power for breaking a tire bead. Wagner's bead breaker has an H-shaped frame having a hinge in the crossing member. An inflatable air bag is positioned within the H-shaped frame at one end, and a tire is positioned at the opposing end of the frame. With the tire in position, the air bag is inflated, causing the opposing end of the H-shaped frame to squeeze the tire therein and break the bead. Wagner's portable tire bead breaker requires a source of pneumatic power to inflate the air bag sufficiently enough to break the tire bead, which may not be readily available in remote locations.

SUMMARY

Embodiments of a winch powered tire bead breaker disclosed herein, generally have a pair of arms that are pivotally connected to one another. The pair of arms can be spaced apart from one another so that a tire mounted on a wheel can be positioned between the two arms, and then the arms actuated to apply a pressure to the sidewalls of the tire therebetween for breaking the tire bead. The bead breaker can be mounted and braced against a vehicle mountable winch and the pair of arms can then be actuated by the winch. In an embodiment, a working end of the winch, such as its cable, can be operatively connected to the tire bead breaker, for actuating the pair of arms.

In a broad aspect, a tire bead breaker for mounting on a vehicle mountable winch having a working end and for breaking a tire bead of a tire mounted on a wheel comprises a pair of arms having a static support arm having a first grip pad at its distal end, and a moveable arm having a second grip pad at its distal end. The moveable arm has a load point or point of connection for releaseably securing to the working end of the winch and is pivotally connected to the static support arm at their respective proximal ends. The first and second grip pads are generally juxtaposed from one another and the moveable arm is moveable, relative to the static support arm, between an open position and a closed position.

The tire bead breaker further has a mount disposed intermediate on the static support arm on an inside edge, opposite the moveable arm, for temporarily mounting the tire bead breaker to the winch and bracing the tire bead breaker against the winch when the working end of the winch is releasably secured to the load point or point of connection and the winch is actuated for moving the moveable arm towards the static support arm and into its closed position for reducing a lateral spacing between the juxtaposed grip pads and squeezing the tire for breaking the tire bead.

In another broad aspect, a method of breaking a tire bead of a wheel mounted tire using a vehicle mountable winch involves providing a winch powered tire bead breaker having a moveable arm pivotally connected to a static support arm and forming a tire-receiving opening therebetween, the moveable arm operable between an open position and closed position relative to the static support arm, releaseably mounting the tire bead breaker onto the winch and bracing the static support arm against the winch, positioning the moveable arm into its open position, engaging a working end of the winch with the moveable arm, positioning the wheel mounted tire between the moveable arm and the static support arm, and actuating the winch for moving the moveable arm from its open position towards the winch into its closed position for engaging a first sidewall of the tire facing away from the winch and breaking the tire bead between the wheel and the first sidewall of the tire.

DETAILED DESCRIPTION

Figure 1:
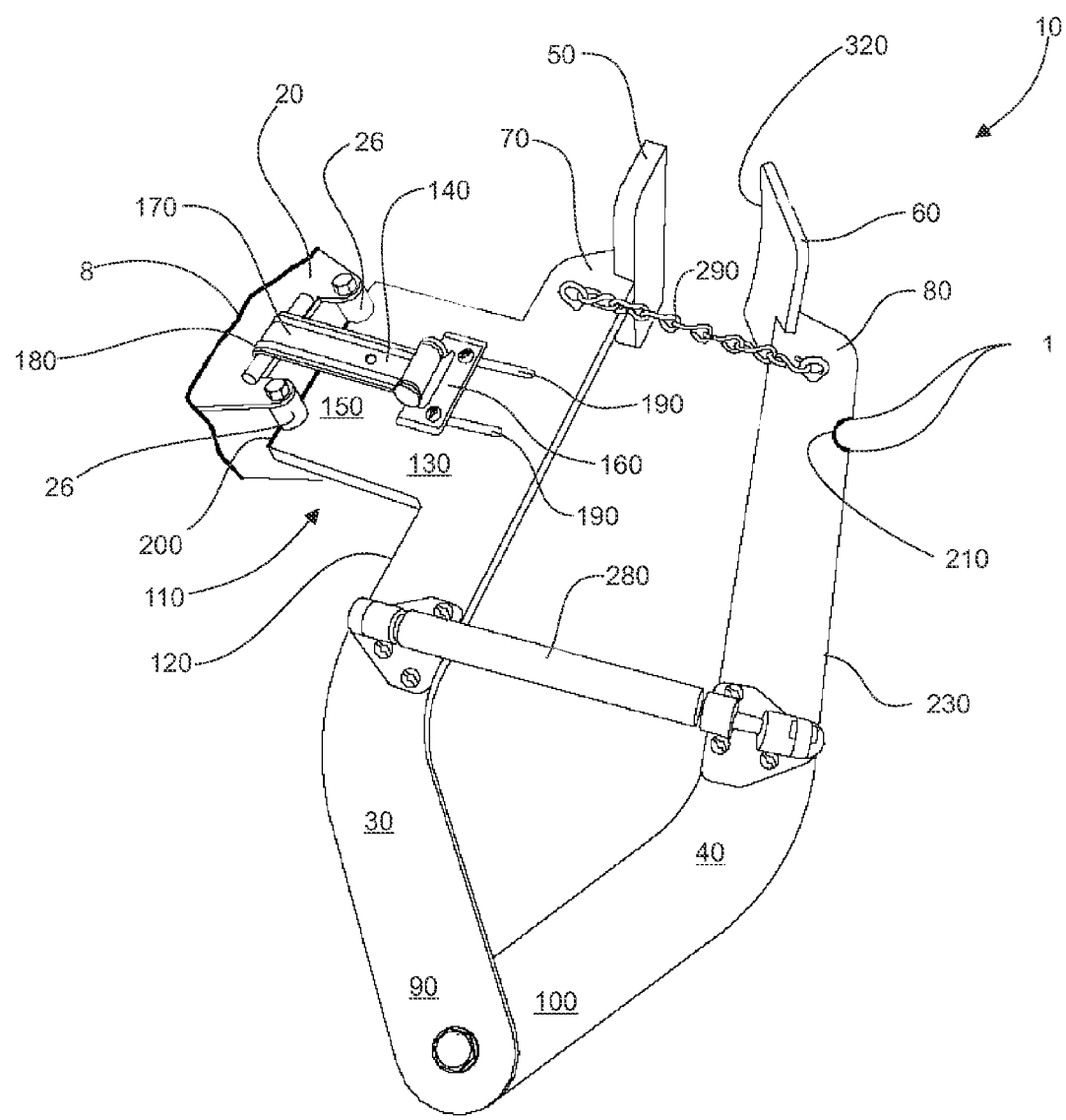
FIG. 1 is a perspective view of a tire bead breaker having a moveable arm pivotally connected to a static support arm temporarily mounted to a winch.
Figure 2:
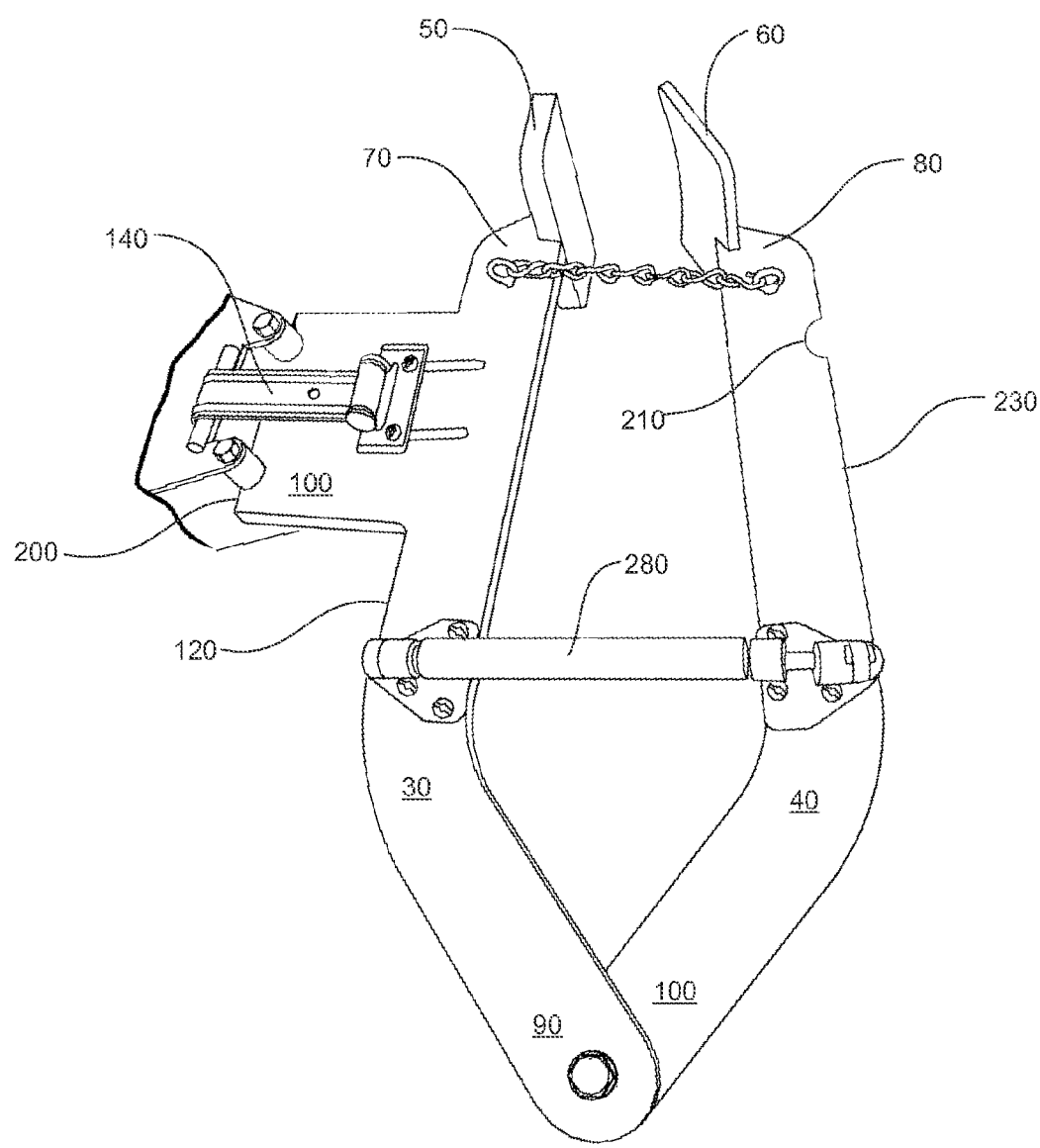
FIG. 2 is a representative drawing of the tire bead breaker of FIG. 1, illustrating a biasing means and a locking means.
Figure 3:
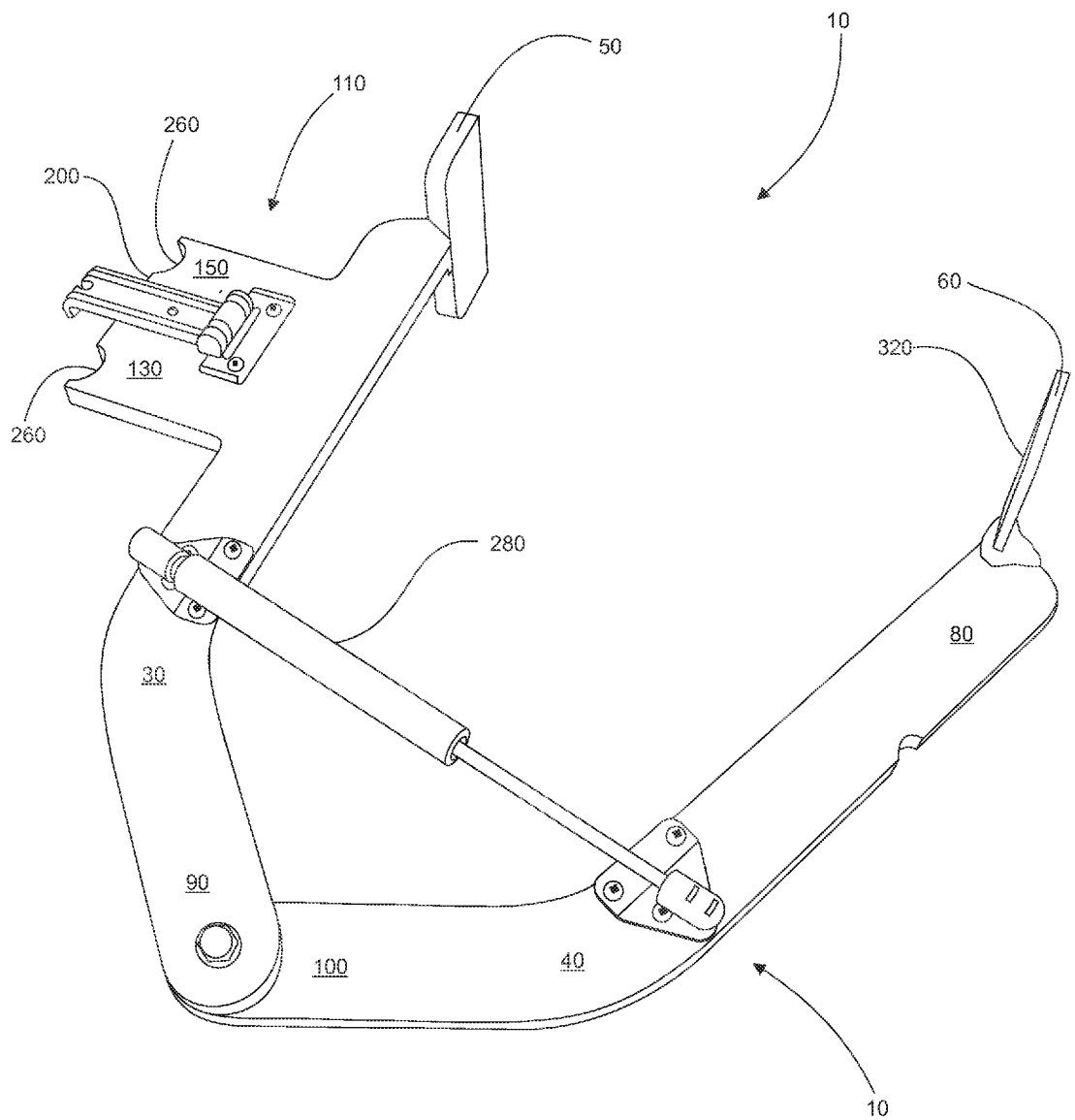
FIG. 3 is a representative drawing of the tire bead breaker of FIG. 1, illustrating the moveable arm in its opened position.

With reference to FIGS. 1 to 3, a portable winch powered or winch actuated tire bead breaker 10 can be temporarily mounted onto a vehicle 8 including a recreational vehicle, truck, and all-terrain vehicle (ATV). Generally equipment for breaking tire beads are not provided as fixed equipment on a vehicle, and if so would add to the weight and size of the vehicle and protrude awkwardly. Such vehicles are often equipped with pulling devices, typically a winch 20, mounted thereto. The winch 20 is secured to, incorporated into, or otherwise supported from the vehicle 8. Accordingly, embodiments of the bead breaker 10 can be temporarily mounted to the vehicle 8 and further utilize the vehicle's winch 20 for actuation.

The bead breaker 10 has a pair of arms comprising a static support arm 30 and a moveable arm 40. The static support arm 30 is temporarily supportable against the vehicle 8, including as against the vehicle's winch 20, so that the movable arm 40 can be manipulated relative to the static support arm 30.

A first grip pad 50 is located at a distal end 70 of the static support arm 30 and a second grip pad 60 is located at a distal end 80 of the moveable arm 40. When actuated, the first and second grip pads 50,60 perform the breaking action. The static support arm 30 and the movable arm 40 are pivotally connected to one another at their respective proximal ends 90,100, resulting in the grip pad 40 of the static support arm 30 being generally opposing or juxtaposed from the grip pad 60 of the moveable arm 40. The moveable arm 40 is pivotally moveable relative to the static support arm 30, between a closed position (FIG. 2) and an open position (FIG. 3) for moving the first and second grip pads 50,60 relative to each other.

Intermediate the proximal and distal ends 70,80 of the static support arm is a mount 110 for temporarily supporting the bead breaker 10 from the vehicle 8 at the winch 20. In an embodiment, the mount 110 is braced against the winch 20. Being braced against the vehicle and adjacent thereto, the static support arm 30 is generally located at an inside of the bead breaker 10 and the movable arm is located at an outside of the bead breaker 10. Using this relative spatial terminology, the mount 110 is located on an inside edge 120 of the static support arm 30. When arranged for use, the mount 110 extends inwardly from the inside edge 120 of the static support arm 30 and towards the vehicle 8.

Figure 4:
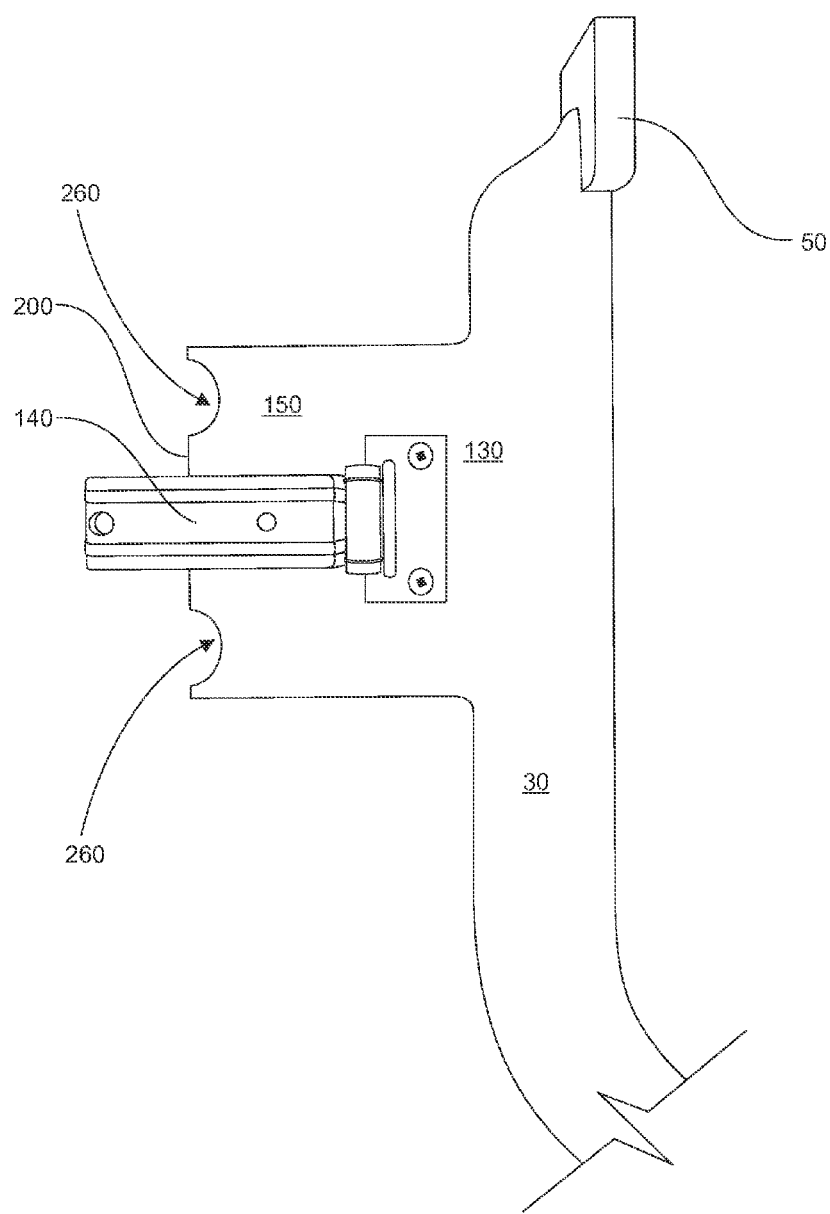
FIG. 4 is a representative drawing of the tire bead breaker of FIG. 1, illustrating the mount having an edge with a profile to correspond to a profile of a winch to which it is mounted thereon.

As shown in FIGS. 4 and 5, and in greater detail, the mount 110 comprises a mounting plate 130 located extending away from the static support arm 30. The plate comprises a vehicle engagement edge 200 and a support latch 140. The latch 140 extends at a first end 160 from an upper surface 150 of the plate 130 and has a second, vehicle-engagement end 200 for temporarily engaging the vehicle. As shown, the first end 160 of the latch 140 can be pivotally secured to mounting plate 130 for providing adjustability of the latch 140 for engaging the vehicle 8.

In this embodiment, the latch's second engagement end 180 temporarily or releaseably mounts engages the vehicle 8, such as at structure supporting the winch 20 or at the winch 20 itself. The engagement end is a latch hook 180 and engages a complementary anchor 185 at the vehicle 8. The anchor 185 can be hole for receiving the hook or, as shown, a bar over which the latch hook can engage.

Referring back to FIG. 1, in an embodiment, the latch 140 and mounting plate 130 can be equipped with adjustment means for accommodating dimensional variations including between the latch 140 and anchor 185. As shown in FIG. 1, one or more adjustment elongated slots 190 can extend along the upper surface 150 of the mounting plate 130 away from the static support arm 30. Fasteners to secure the latch 140 to the mounting plate 130 can be movably supported through the one or more elongated slots 190 either towards or away from the static support arm 30, shortening or lengthening the reach of the latch 140 respectively. Such movement of the latch 140 permits an operator to adjust a spacing between the bead breaker 10 and the vehicle 8, allowing the bead breaker 10 to be supported on a large range of vehicles and vehicle-mountable winches as an after-market accessory.

Figure 5A:
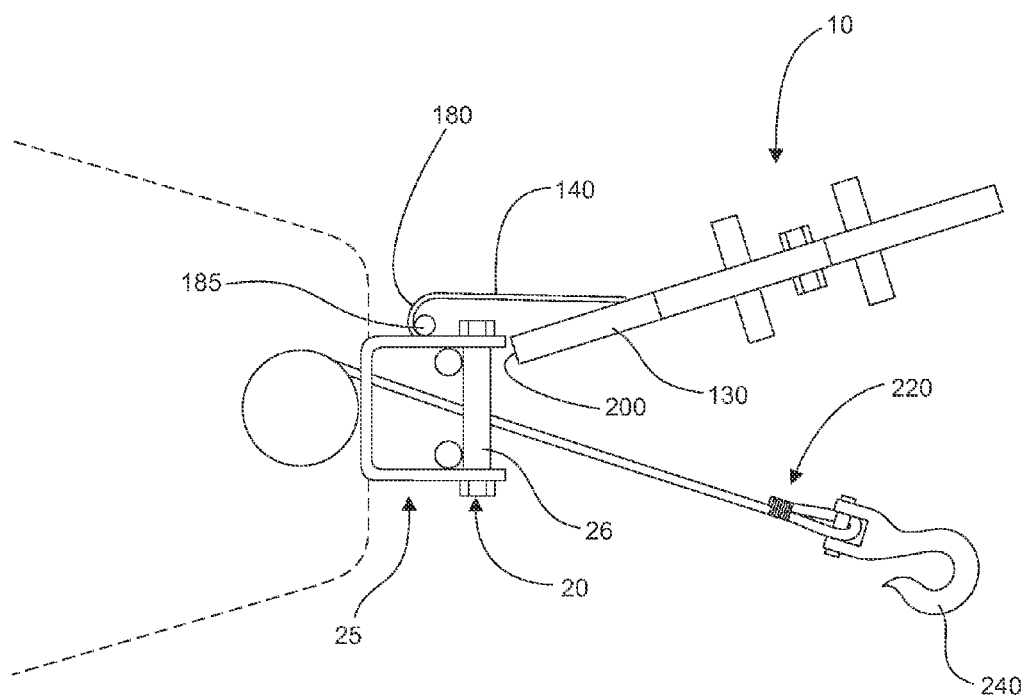
FIG. 5A is a schematic drawing of the tire bead breaker of FIG. 1 being angled above a winch for engagement thereof.

As shown in FIGS. 4 and 5A, the winch 20 is mounted to vehicle 8 using structure 25. In this embodiment, the structure, whether part of the vehicle 8 or of the winch 20, is fit with anchor 185. The bead breaker 10 is temporarily connected to the structure by the latch 140, and the bead breaker 10 is braced thereagainst. In this embodiment, the mounting plate 130 engages the winch and the plate 130 comprises a vehicle-engaging edge 200 profiled to correspond to a profile of the winch 20 permitting the bead breaker 10 to correspondingly fit and brace against the winch 20. As shown, the particular winch 20 includes a pair of vertically extending and spaced winch cable guide rollers 26,26 and thus the vehicle-engaging edge 200 comprises a profile having a pair of spaced support notches 260, 260 corresponding to the spacing of the vertical rollers 26,26. The bead breaker 10 hangs on the latch and the mounting plate 130 rotates towards the winch 20 for support thereon. Support notches 260, 260 stabilize the mount 130 from excessive side-to-side movement.

Figure 5B:
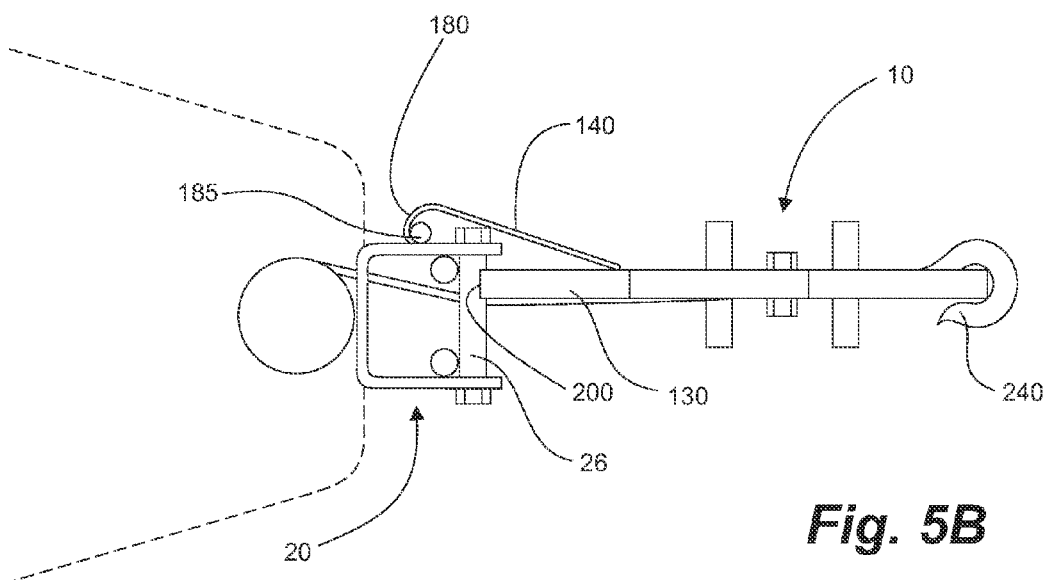
FIG. 5B is a schematic drawing of the tire bead breaker of FIG. 5A, illustrating the bead breaker being braced against the winch when temporarily mounted to the winch.
Figure 6:
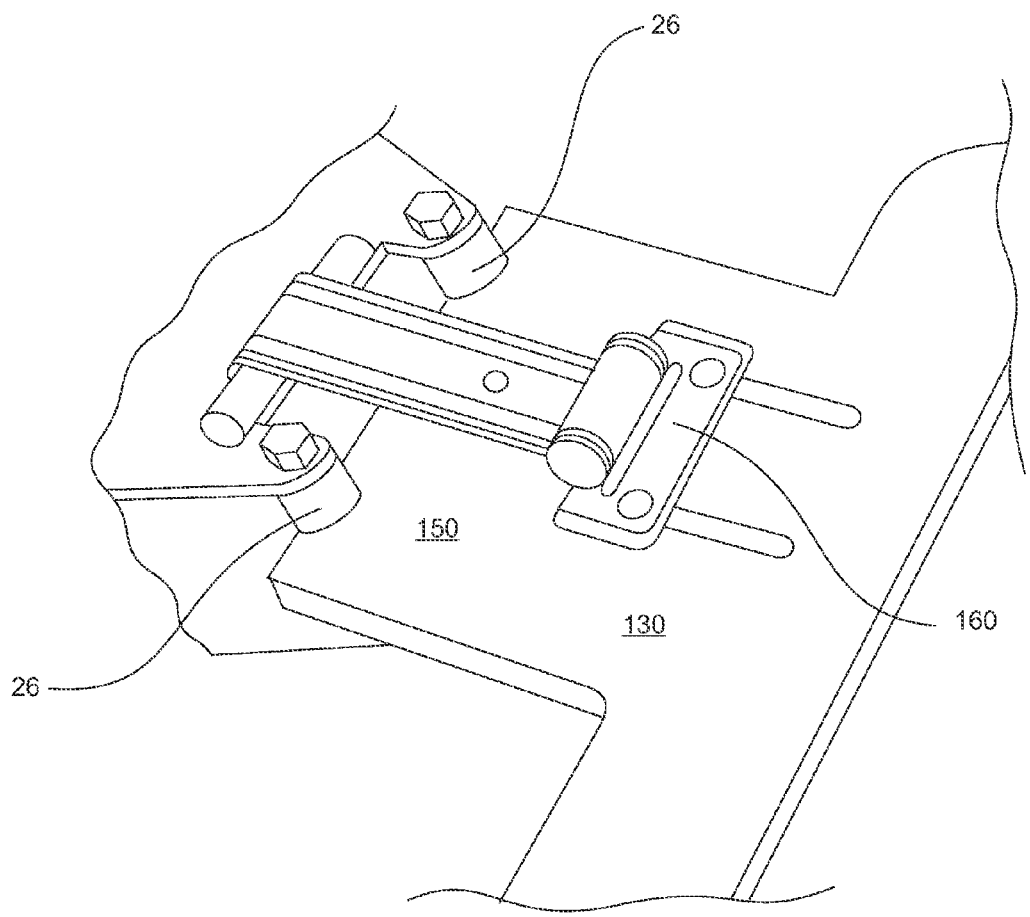
FIG. 6 is a representative drawing of the bead breaker of FIG. 1 being positioned to temporarily mount to a winch having vertical rollers.
Figure 7:
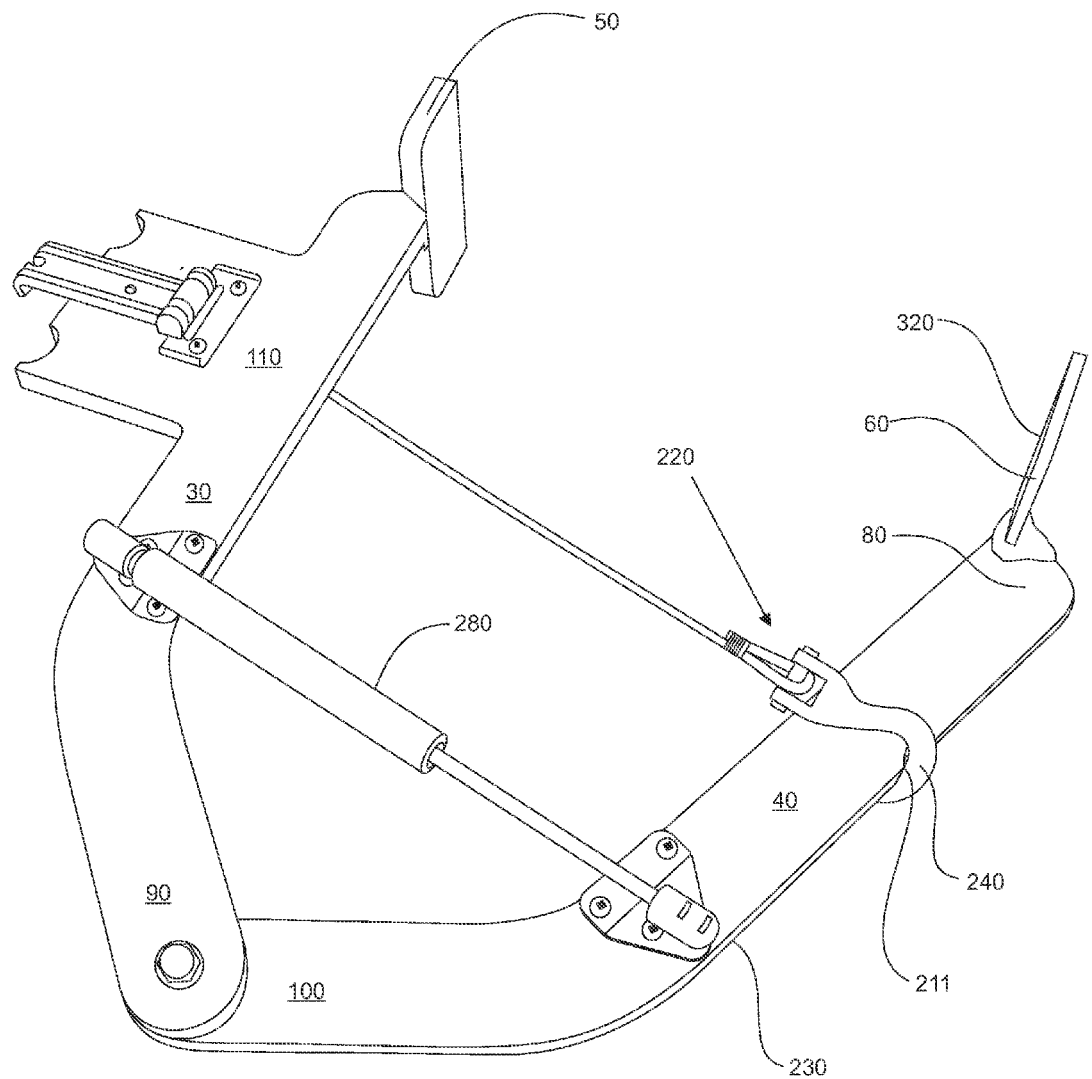
FIG. 7 is a representative drawing of the bead breaker of FIG. 1 mounted on a winch and having the moveable arm in its opened positioned and releaseably secured to a working end of the winch.
Figure 11A:
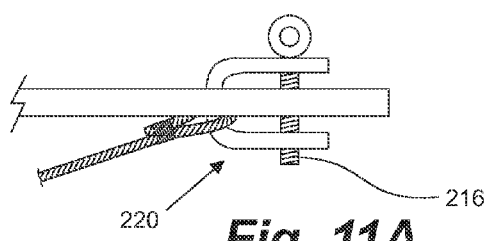
FIG. 11A is a representative side view of a working end having a clevis end releaseably secured to a moveable arm.
Figure 12A:
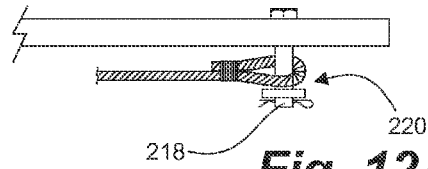
FIG. 12A is a representative side view of a working end having an eyelet ended cable releaseably secured to a moveable arm.
Figure 11B:
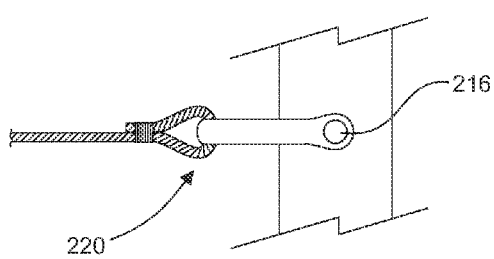
FIG. 11B is a plan view of the embodiment of FIG. 11A.
Figure 12B:
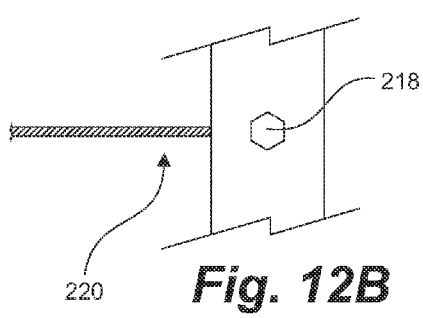
FIG. 12B is a plan view of the embodiment of FIG. 12A.

The winch 20 further comprises a working end 220 at the end of cable 250. As shown in FIGS. 5A, 5B and 7, typically the working end 220 is a hook 240 although other ends for releasable connection are contemplated. As shown in FIGS. 11A and 12A, examples of the working end 220 include clevises (FIGS. 11A and 11B), and eyelets and pin-type connections (FIGS. 12A and 12B).

With reference to FIGS. 1 to 3, the moveable arm 40 of the bead breaker 10 further comprises a point of connection or load point 210 permitting the working end 220 of the winch 20 to be operatively engaged thereto. The load point 210 is intermediate the movable arm 40 between the proximal end 100 and the second grip pad 60. The connection of the working end 220 and load point 210 permits the pulling forces of the winch 20 to cause the movable arm 40 to be pulled inwardly towards the static support arm 30. Operation of the winch 20 retracts the cable, moving of the moveable arm 40 from its open position to its closed position. In the case of a hook 240, the load point 210 can be an outside edge 230 of the movable arm 40. The load point is generally opposite the mount plate 130.

Figure 10A:
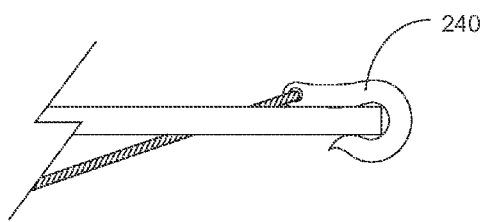
FIG. 10A is a representative side view of a working end of a winch having a hook ended cable releasably secured to a moveable arm of a tire bead breaker, the hook being positioned over the moveable arm.
Figure 10C:
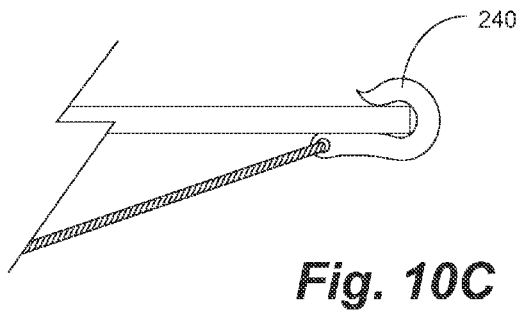
FIG. 10C is representative side view of the hook ended cable releasably secured to the moveable arm of FIG. 10A, the hook being positioned underneath the moveable arm.
Figure 10B:
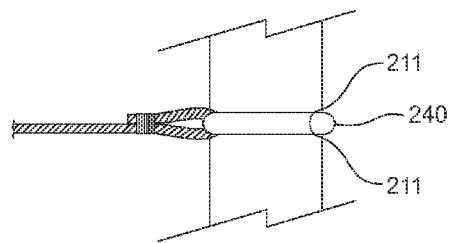
FIG. 10B is a plan view of the embodiment of FIG. 10A.
Figure 10D:
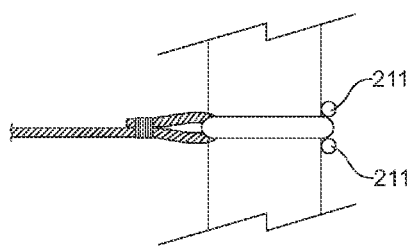
FIG. 10D is a plan view of the embodiment of FIG. 10C.

When force is applied, the hook 240 is vulnerable to hook slip, where the hook 240 can slide laterally along an outer side 230 of the moveable arm 40, rendering the pulling action less effective. Therefore, where lateral sliding can occur, the load point 210 is provided with lateral restraints or stops 211,211 such as the end termini of a pulling notch 250 as shown in FIGS. 1, 7 and 10B, or spaced stops 211 such as bars 212,212.

In embodiments where the working end 220 of the winch 20 includes a small hook (not shown), or clevis end (FIGS. 11A and 11B) or eyelet of a cable (FIGS. 12A and 12B), the load point can have a hole 214 in the movable arm 40. For a clevis end or eyelet a pin 216 or bolt 218 can be provided.

To facilitate ease of opening and closing the bead breaker 10, an opening assist is provided to bias the bead breaker 10 in the open position. Biasing means 280, such as an air shock, can be positioned to extend between the static support arm 30 and the moveable arm 40, for biasing the moveable arm 40 into its open position. Applicant notes that the biasing means 280 should be positioned sufficiently away from the juxtaposed grip pads 50,60 to ensure that the wheel mounted tire can be placed in the tire-receiving opening or mouth between the grip pads 50,60. Further, in embodiments comprising such a biasing means 280, and for transportation and storage, a locking means 290, such as a chain, can be positioned between the static support arm 30 and the moveable arm 40 for locking the moveable arm 40 into its or some intermediate position closed position.

In Operation

With reference to FIGS. 5A and 5B, the winch powered bead breaker 10 can be releaseably mounted to the vehicle 8, such as by bracing against the winch 20. As shown, initially, the mounting plate 130 of the bead breaker 10 is tilted at an angle above the winch 20 for orienting and locating the latch 140 close to the vehicle 8, permitting the latch 140 to releaseably engage or mount to a portion of a frame of the vehicle, winch 20 or other structural component thereof.

As shown, in an embodiment, and as shown, the latch is fit with a latch hook 180 that is releaseably engaged with an anchor 185 at the winch 20. The bead breaker 10 can then be lowered, swinging the mounting plate 130 into engagement to brace against the winch 20.

Referring back to FIG. 1, arcuate support notches 260,260 of the vehicle-engaging edge of 200 the mounting plate 130 are arranged for receiving vertical rollers 26,26 of the winch 20. Such an arrangement increases stability of the temporary engagement between the bead breaker 10 and the winch 20 by preventing lateral movement of the bead breaker 10 relative to the winch 20. In other words, the bead breaker 10, when releasably mounted to the winch 20 will not move side-to-side as a result of bracing against the vertical rollers 26,26.

After the bead breaker 10 has been releaseably mounted to the winch 20, the moveable arm 40 can be positioned into its open position for accepting a wheel mounted tire between the juxtaposed grip pads 50,60. In an embodiment, and as shown in FIGS. 1 to 4, a biasing means 280, such as an air shock, can be positioned to extend between the static support arm 30 and the moveable arm 40, to bias the moveable arm 40 into its open position.

Applicant notes that the biasing means 280 should be positioned sufficiently away, spaced laterally, from the juxtaposed grip pads 50,60 to ensure that the wheel-mounted tire can be placed between the grip pads 50,60.

Further, in embodiments comprising a biasing means 280, for transportation and storage, a locking means 290, such as a chain, can be temporarily positioned or affixed between the static support arm 30 and the moveable arm 40 for locking the moveable arm 40 into its closed position.

Referring to FIG. 7, with the moveable arm 40 in its open position, the working end 220 of the winch 20 can be releaseably secured to the moveable arm 40 at the load point 210. As shown, the working end 220 of the winch 20 can be a hook 240 which can engage a pulling notch 250 on the outside edge 230 of the moveable arm 40.

Figure 8:
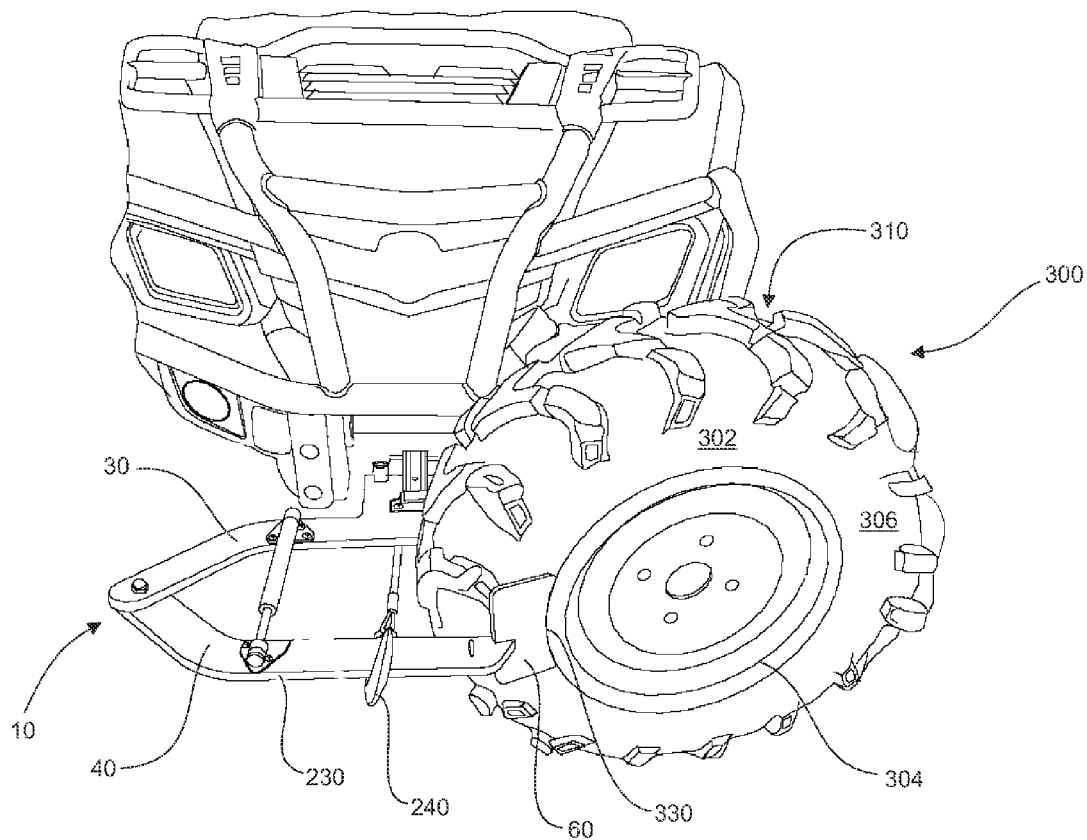
FIG. 8 is a representative drawing of a wheel mounted tire placed between juxtaposed grip pads, the grip pad of the moveable arm engaging the sidewall of the tire adjacent a rim of the wheel.

With reference to FIG. 8, with the bead breaker 10 in the open position, the tire portion 300 of a tire 302 mounted on a wheel 304 can be positioned between the juxtaposed grip pads 50,60. In an embodiment, the first grip pad 50 of the static support arm 30 can be arranged to support the wheel 304 when the wheel-mounted tire 300 is positioned between the juxtaposed grip pads 50,60. The second grip pad 60 of the movable arm 40 can be arranged to engage the tire portion 300.

The winch 20 actuated for moving the moveable arm 40 from its open position towards its closed position for squeezing the tire 302. The static support arm 30 is braced against the vehicle 8 or winch 20 and the wheel or inside of the tire 300 is supported against the static support arm 30. The pulling of the working end 220 of the winch 20, and connected movable arm 40, toward the static support arm 30 and the fact that the bead breaker 10 is braced against the winch 20 results in the squeezing of the tire 300 between the juxtaposed grip pads 50,60.

Figure 9:
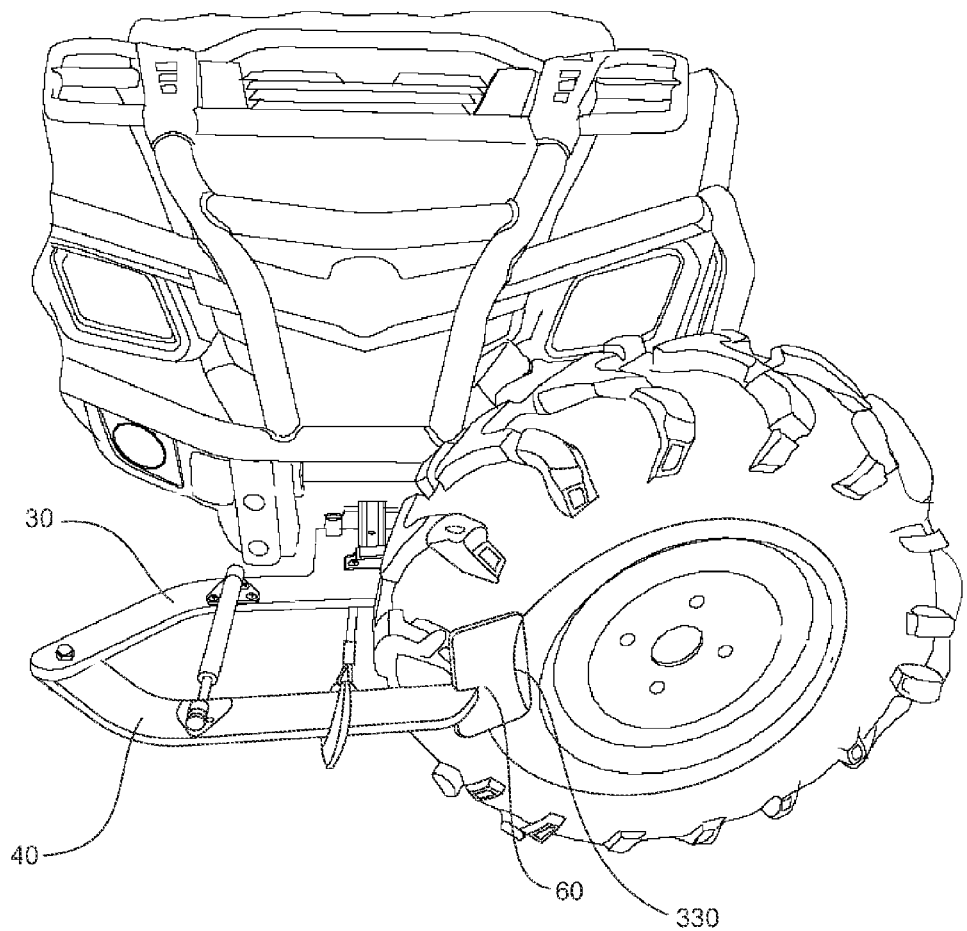
FIG. 9 is a representative drawing of the bead breaker of FIG. 8, illustrating a broken tire bead.

As shown in FIGS. 8 and 9, the closing of the moveable arm 40 causes the grip pad 60 thereof to engage an outer sidewall 306 of the tire 300, being that sidewall 306 facing away from the winch 20. Simultaneously, although not shown, a sidewall 310 of the tire facing towards the winch 20, the wheel 304 or both, engage the first grip pad 50 of the static support arm 30 resulting in the squeezing of the tire sidewalls 306 away from the wheel 304 and causing the break in the tire bead from the wheel.

Further, in embodiments shown in FIGS. 1 to 3, and 7 to 9, the second grip pad 60, of the moveable arm 40, can be angled inwardly towards the first grip pad 50 of the static support arm 30, for ensuring that the grip pad 60 of the moveable arm 40 engages the outer sidewall 306. In embodiments, the grip pad 60 of the moveable arm 40 can also have a peripheral edge 320 having an arcuate profile 330 corresponding to the curvature of the wheel for permitting close proximity of the grip pad 60 with the wheel 304 while avoiding contact therewith.

Once the tire bead between the outer sidewall 306 broken free of the wheel, the winch 20 can be released to enable the moveable arm 40 back into its open position. The wheel-mounted tire can be pivoted and repositioned between the juxtaposed grip pads 50,60 and the winch 20 actuated again to break the other tire bead.

While the action of the breaking has been described in the context of the breaking the bead of an outer sidewall 306 from the wheel, having some convenience associated with ease of viewing, one could similarly break the bead of an inner sidewall, with the optional adjustment of the form and function of the grip pads 50,60.

Once the bead breaker is no longer required, one lifts the bead breaker 10 to release the latch 140. The bead breaker 10 can be stored for later use.

The embodiments of the invention for which an exclusive property or privilege is claimed are defines as follows:

1. A tire bead breaker for breaking a tire bead of a tire from a wheel, the vehicle having a winch having a working end, the bead breaker comprising:
    a pair of arms having:
        a static support arm having a first grip pad at its distal end;
        a moveable arm having a second grip pad at its distal end, the moveable arm pivotally connected to the static support arm at respective first and second proximal ends, the movable arm movable relative to the static support arm between an open position and a closed position, wherein the first grip pad and the second grip pad are generally juxtaposed from one another;
    a mount disposed intermediate along an inside edge of the static support arm, opposite the moveable arm, the mount having a vehicle-engaging edge for bracing the static support arm against the vehicle at about the winch; and
    a load point intermediate along the movable arm and generally opposing the mount, the loading point being releaseably securable to the working end of the winch,
    wherein, in the open position, the tire can be positioned between the first and second pads and when the working end of the winch is releaseably secured to the loading point, the winch is actuatable for moving the moveable arm towards the static support arm and towards its closed position for squeezing the tire between the juxtaposed grip pads and breaking the tire bead from the wheel.

2. The tire bead breaker of claim 1, wherein the mount further comprises:
    a mounting plate extending away from the static support arm towards the winch; and
    a latch supported extending away from the mounting plate to the vehicle for temporarily mounting the tire bead breaker thereto.

3. The tire bead breaker of claim 2, wherein the vehicle-engaging edge engages the winch.

4. The tire bead breaker of claim 3, wherein the winch further comprises a cable connected to the working end of the winch, and the vehicle-engaging edge is profiled to correspond to a profile of spaced, cable guide rollers.

5. The tire bead breaker of claim 2, wherein the mounting plate further comprises one or more elongated slots extending away from the static support arm for repositioning the latch towards or away from the winch.

6. The tire bead breaker of claim 2, wherein the latch further comprises a latch hook for temporarily hooking to the winch.

7. The tire bead breaker of claim 6, wherein the latch is hinged from the mounting plate.

8. The tire bead breaker of claim 1, wherein the first grip pad of the static support arm is adapted to support the wheel when the wheel is positioned between the juxtaposed grip pads.

9. The tire bead breaker of claim 1, wherein the second grip pad of the moveable arm is angled inwards towards the winch relative to the moveable arm for ensuring that the grip pad of the moveable arm engages an outside sidewall of the tire facing away from the winch.

10. The tire bead breaker of claim 1, wherein the second grip pad of the moveable arm further comprises a peripheral edge having an arcuate profile corresponding to a profile of a rim of the wheel.

11. The tire bead breaker of claim 1, further comprising a biasing means between the moveable arm and the static support arm for biasing the moveable arm into its open position.

12. The tire bead breaker of claim 11, wherein the biasing means further comprises an air shock position between the moveable arm and the static support arm.

13. The tire bead breaker claim 1, further comprising locking means between the moveable arm and the static support arm for temporarily locking the moveable arm in its closed position for transportation and storage.

14. The tire bead breaker of claim 1, wherein the load point further comprises a pulling notch on an outside edge of the movable arm for releaseably securing to the working end of the winch.

15. A method of breaking a tire bead of a tire mounted to a wheel using a winch mounted to a vehicle comprising:
    providing a winch powered tire bead breaker having a moveable arm pivotally connected to a static support arm and forming a tire-receiving opening therebetween, the moveable arm operable between an open position and closed position relative to the static support arm;
    bracing the static support arm against the vehicle;
    positioning the moveable arm into its open position;
    releaseably securing a working end of the winch with the moveable arm;
    positioning the tire in the tire-receiving opening; and
    actuating the winch for moving the moveable arm towards the winch from its open position towards its closed position for engaging a first sidewall of the tire facing away from the winch and breaking the tire bead between the wheel and the first sidewall of the tire.

16. The method of claim 15, further comprising:
    moving the moveable arm back into its open position;
    removing the tire from between the moveable arm and the static support arm and pivoting the tire;
    repositioning the tire between the moveable arm and static support arm;
    actuating the winch for actuating the moveable arm into its closed position for engaging a second sidewall opposite the first sidewall and breaking the tire bead between the wheel and the second sidewall.

17. The method of claim 16, wherein moving the moveable arm back into its open position further comprises releasing the winch.

18. The method of claim 17, wherein moving the movable arm back into its open position further comprises disengaging the working end of the winch from the moveable arm.

19. The method of claim 15, further comprising locking the moveable arm in its closed position for transportation or storage.

* * * * *